United States Patent
Heffley et al.

(10) Patent No.: US 8,010,963 B2
(45) Date of Patent: Aug. 30, 2011

(54) METHOD, APPARATUS AND PROGRAM STORAGE DEVICE FOR PROVIDING LIGHT WEIGHT SYSTEM CALLS TO IMPROVE USER MODE PERFORMANCE

(75) Inventors: Daniel Heffley, Tucson, AZ (US);
Wenjeng Ko, Tucson, AZ (US);
Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1386 days.

(21) Appl. No.: 11/291,613

(22) Filed: Dec. 1, 2005

(65) Prior Publication Data

US 2007/0143436 A1   Jun. 21, 2007

(51) Int. Cl.
*G06F 9/46* (2006.01)
*G06F 9/00* (2006.01)
(52) U.S. Cl. ..................... 718/100; 712/220
(58) Field of Classification Search .............. 718/108, 718/100; 712/220
See application file for complete search history.

(56) References Cited

U.S. PATENT DOCUMENTS

| | | | |
|---|---|---|---|
| 5,948,097 A * | 9/1999 | Glew et al. | 712/220 |
| 6,128,641 A | 10/2000 | Fleck et al. | |
| 6,735,774 B1 * | 5/2004 | Krishnaswamy | 719/328 |
| 7,073,173 B1 * | 7/2006 | Willman | 718/1 |
| 2002/0138664 A1 | 9/2002 | Blott et al. | |
| 2004/0122834 A1 * | 6/2004 | Durrant | 707/100 |
| 2005/0010804 A1 | 1/2005 | Bruening et al. | |

OTHER PUBLICATIONS

Gulbrandsen, John. "System call optimization with the SYSENTER instruction", Summit Soft Consulting, Sep. 16, 2004.*
"Intel Architecture Software Developer's Manual", Intel, vol. 2: Instruction Set Reference, 1999.*

* cited by examiner

*Primary Examiner* — Meng An
*Assistant Examiner* — Brian Chew
(74) *Attorney, Agent, or Firm* — Griffiths & Seaton PLLC

(57) ABSTRACT

A method, apparatus and program storage device for providing light weight system calls to improve user mode performance is disclosed. A range of system call code for the light weight system calls is provided in a system call table. The light weight system calls skip the code for saving and restore processor context.

18 Claims, 8 Drawing Sheets

| Service | System Call Code | Arguments | Result |
|---|---|---|---|
| xxxx_xxxx | 1 | $xx = integer | |
| xxxx_xxxx | 2 | $yy = float | |
| xxxx_xx | 3 | $xx = string | |
| xxxxxx_xxxx | 4 | | integer (in $xx) |
| xxxxxx_xxxx | 5 | | float (in $xx) |
| xxxx_xxxx | 6 | $xx = buffer, $xx = length | string (in $xx) |
| xxxx_xxxx | 7 | | |
| xxxx | 8 | | address (in $xx) |
| xxxx | 9 | | |
| ... | ... | ... | ... |
| xxxx_xxxx | 201 | $xx = integer | |
| xxxx_xxxx | 202 | $yy = float | |
| xxxx_xx | 203 | $xx = string | |
| xxxxxx_xxxx | 204 | | integer (in $xx) |
| xxxxxx_xxxx | 205 | | float (in $xx) |
| xxxx_xxxx | 206 | $xx = buffer, $xx = length | string (in $xx) |
| xxxx_xxxx | 207 | | |

Entry Points For Lightweight System Calls

Fig. 5

METHOD, APPARATUS AND PROGRAM STORAGE DEVICE FOR PROVIDING LIGHT WEIGHT SYSTEM CALLS TO IMPROVE USER MODE PERFORMANCE

BACKGROUND OF THE INVENTION

1. Field of the Invention

This invention relates in general to a computer operating systems, and more particularly to a method, apparatus and program storage device for providing light weight system calls to improve user mode performance.

2. Description of Related Art

A thread is a sequence of instructions. Multiple threads can be executed in parallel on many computer systems. Multithreading generally occurs by time slicing where a single processor switches between different threads or by multiprocessing where threads are executed on separate processors. Threads are similar to processes, but differ in the way that they share resources. Many modern operating systems directly support both time-sliced and multiprocessor threading with a process scheduler. The operating system kernel allows programmers to manipulate threads via the system call interface. Some implementations are called kernel threads or lightweight processes.

Operating systems generally implement threads in one of two ways: preemptive multithreading, or cooperative multithreading. Preemptive multithreading allows the operating system to determine when a context switch should occur. The term context simply refers to all the information that completely describes the process's current state of execution, e.g., the contents of the CPU registers, the program counter, the flags, etc. The process of saving the currently executing process's context, flushing the CPU, and loading the next process's context, is called a context switch. A context switch for a full-fledged, multithreaded process will obviously take a lot longer than a context switch for an individual thread within a process. So depending on the amount of hardware support for context switching and the type of context switch, a context switch can take a decent amount of time, thereby wasting a number of CPU cycles. Cutting back on context switches improves execution efficiency and reduces waste, as does the extensive use of multithreading since thread switches are usually faster than full-sized process switches.

Cooperative multithreading, on the other hand, relies on the threads themselves to relinquish control once they are at a stopping point. This can create problems if a thread is waiting for a resource to become available. The disadvantage to preemptive multithreading is that the system may make a context switch at an inappropriate time, causing priority inversion or other bad effects, which may be avoided by cooperative multithreading.

In multithreaded operating systems, all threads in a task share the same address space and are usually sharing large amounts of data. Context switching between two threads in the same task may take much less time than context switching between two threads in different tasks. After a context switch in a multithreaded system a new thread will be running, and perhaps a new task.

The kernel mode is a privileged mode in which only the kernel runs and which provides access to all memory locations and all other system resources. Context switches can occur only in kernel mode. Other programs, including applications, initially operate in user mode, but they can run portions of the kernel code via system calls. A system call is a request by an active process for a service performed by the kernel, such as input/output (I/O) or process creation.

Many current computer systems employ two privilege levels: (1) a most privileged level, or kernel-privilege level; and (2) a less privileged level, or application-program privilege level. The privilege level at which a process executes determines the total range or ranges of virtual memory that the process can access and the range of instructions within the total instruction set that can be executed by the processor on behalf of the process.

The privilege concept is used to prevent full access to computing resources by application programs. In order to obtain services that employ resources not directly available to application programs, application programs need to call operating system routines through the operating system interface. Operating system routines can promote the current privilege level to a higher privilege level to allow access to resources, to carry out a task requested by an application program, and then return control to the application program while simultaneously demoting the current privilege level. By restricting application-program access to computer resources, an operating system can maintain operating-system-only-accessible data structures for managing many different, concurrently executing programs, in the case of a single-processor computer, and, on a multi-processor computing system, many different concurrently executing application programs, a number of which execute in parallel. Privilege levels also prevent the processor from executing certain privileged instructions on behalf of application programs. For example, instructions that alter the contents of the process status register may be privileged, and may be executed by the processor only on behalf of an operating system routine running at a high privilege level. Generally, restricted instructions include instructions that manipulate the contents of control registers and special operating-system-specific data structures.

As an example of the use of privilege levels, consider concurrent execution of multiple processes, representing multiple application programs managed by the operating system in a single-processor computer system. The processor can execute instructions on behalf of only a single process at a time. The operating system may continuously schedule concurrently executing processes for brief periods of execution in order to provide, over time, a fraction of the total processing bandwidth of the computer system to each running application program. The operating system schedules a process for execution by removing the process-control block corresponding to the process from the process queue and writing the contents of various memory locations within the process-control block into various control registers and operating-system data structures. Similarly, the operating system removes a process from the executing state by storing the contents of control registers and operating-system data structures into the corresponding process-control block and re-queuing the process-control block to the process queue.

As described above, operating system routines are invoked through system calls, faults, traps, and interrupts during the course of execution of an application program. By maintaining the process queue in memory accessible only to routines executing at the highest privilege level, and by ensuring that some or all instructions required to store and retrieve data from control registers are instructions that have access to the highest privilege level, the architecture of the computing system ensures that only operating-system routines can schedule application processes for execution. Thus, an application program may not manipulate the process queue and control registers in order to monopolize system resources and prevent other application programs from obtaining computing resources for concurrent execution.

The operating system, as part of providing an application programming environment, provides both application-specific and application-sharable memory to application programs. An application program may store private data that the application wishes to be inaccessible to other application programs in private memory regions, and may exchange data with other application programs by storing date in sharable memory. Access to memory is controlled by the operating system through address mapping and access privileges associated with memory pages, each memory page generally comprising some fixed number of bytes. Because the instructions and operating-system data structures necessary for memory mapping and access privilege assignment include instructions and memory accessible only to routines executing at the highest privilege level, an application program executing at a lower privilege level may not remap memory or reassign access privileges in order to gain access to the private memory of other application programs.

Issuing system calls typically involves running a sequence of instructions to save the current context expecting for a process context switch. With the popularity of the Linux operating system, many controller applications have moved from kernel space in non-open source operating systems to user mode programs under Linux. With this move, calling privileged instructions become much more expensive than before because of the probability of a context switch needing to be made. Usually, an application program does not expect a context switch when calling privileged instructions. Nevertheless, system calls that perform the privileged instructions require that the processor context be saved and restored during a system call.

It can be seen then that there is a need for a method, apparatus and program storage device for providing light weight system calls to improve user mode performance.

SUMMARY OF THE INVENTION

To overcome the limitations in the prior art described above, and to overcome other limitations that will become apparent upon reading and understanding the present specification, the present invention discloses a method, apparatus and program storage device for providing light weight system calls to improve user mode performance.

The present invention solves the above-described problems by providing a range of system call code for the light weight system calls in a system call table. The light weight system calls skip the code for saving and restore processor context.

A system call table in accordance with an embodiment of the present invention includes an entry point for identifying at least one light weight system call code block located within a range of addresses allocated in memory for light weight system call code blocks, wherein the light weight system call performs privileged instructions without saving and restoring processor context.

In another embodiment of the present invention, a memory for providing a library of system calls is provided. The memory includes a plurality of addresses, wherein a range of the plurality of addresses is allocated for at least one light weight system call code block.

In another embodiment of the present invention, a program storage device that includes program instructions executable by a processing device to perform operations for providing light weight system calls to improve user mode performance is provided. The operations include allocating a range of addresses in memory for light weight system call code blocks to perform privileged instructions and adding within the range of addresses at least one light weight system call code block for performing a privileged instruction.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 5 is a diagram of a system call table according to an embodiment of the present invention;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing light weight system calls to improve user mode performance. A range of system call code for the light weight system calls is provided in a system call table. The light weight system calls skip the code for saving and restore processor context.

Figure 1:
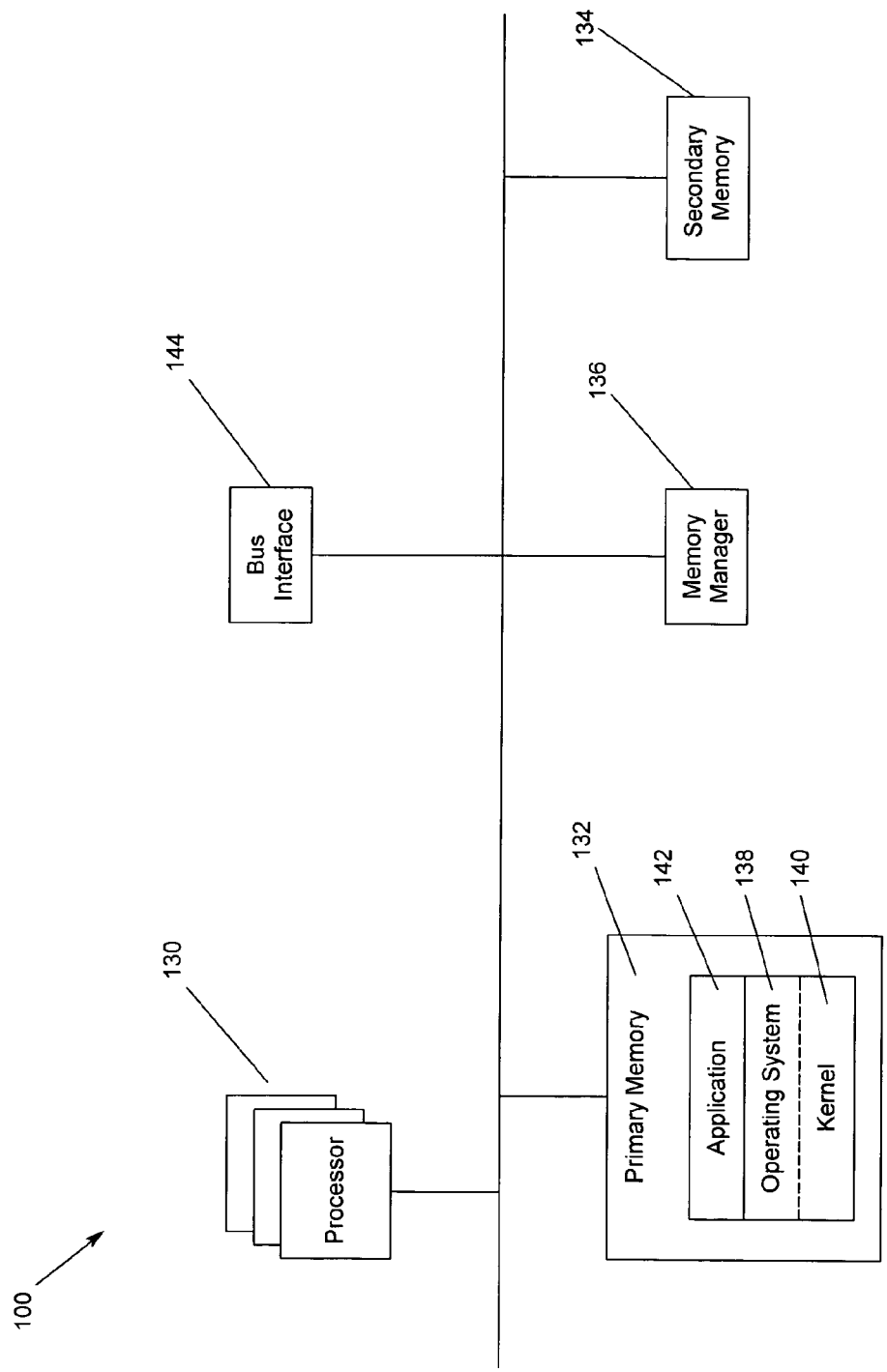
FIG. 1 illustrates a block diagram of a computer system according to an embodiment of the present invention.

FIG. 1 illustrates a block diagram of a computer system 100 according to an embodiment of the present invention. In FIG. 1, the computer system 100 includes one or more processors 130, which are each capable of executing a thread within one of a number of concurrent multithreaded processes. As is typical in multitasking data processing systems, each user process may be allocated its own virtual memory space, which may be mapped partially into a high-speed primary memory 132 and partially into a lower speed secondary memory 134 by memory manager 136.

The computer system 100 and the allocation of system resources to the computer system 100 are controlled by operating system 138. For the purpose of the present discussion, it is assumed that operating system 138 is resident within primary memory 132, although those skilled in the art will appreciate that certain infrequently utilized segments of operating system 138 may be swapped out to secondary memory 134 by memory manager 136. Operating system 138 includes kernel 140, which comprises the lowest layer of operating system 138 that interacts most directly with the computer system 100. Kernel 140 dispatches kernel threads to processors 130 for execution, provides services to device drivers interfacing with hardware within computer system 100, and implements system services, memory management, network access, and the file system utilized by computer system 100. In addition to kernel 140, primary memory 132 also stores frequently utilized segments of application software 142. As is well-known to those skilled in the art, application software 142 communicates with operating system 138 through an Application Programming Interface (API).

Computer system 100 also includes bus interface 144 through which multiple nodes can interface to system resources available within computer system 100. As will be appreciated by those skilled in the art, computer system 100 may also include additional hardware coupled to system bus 146 that is not necessary for an understanding of the present invention and is accordingly omitted for simplicity.

Figure 2:
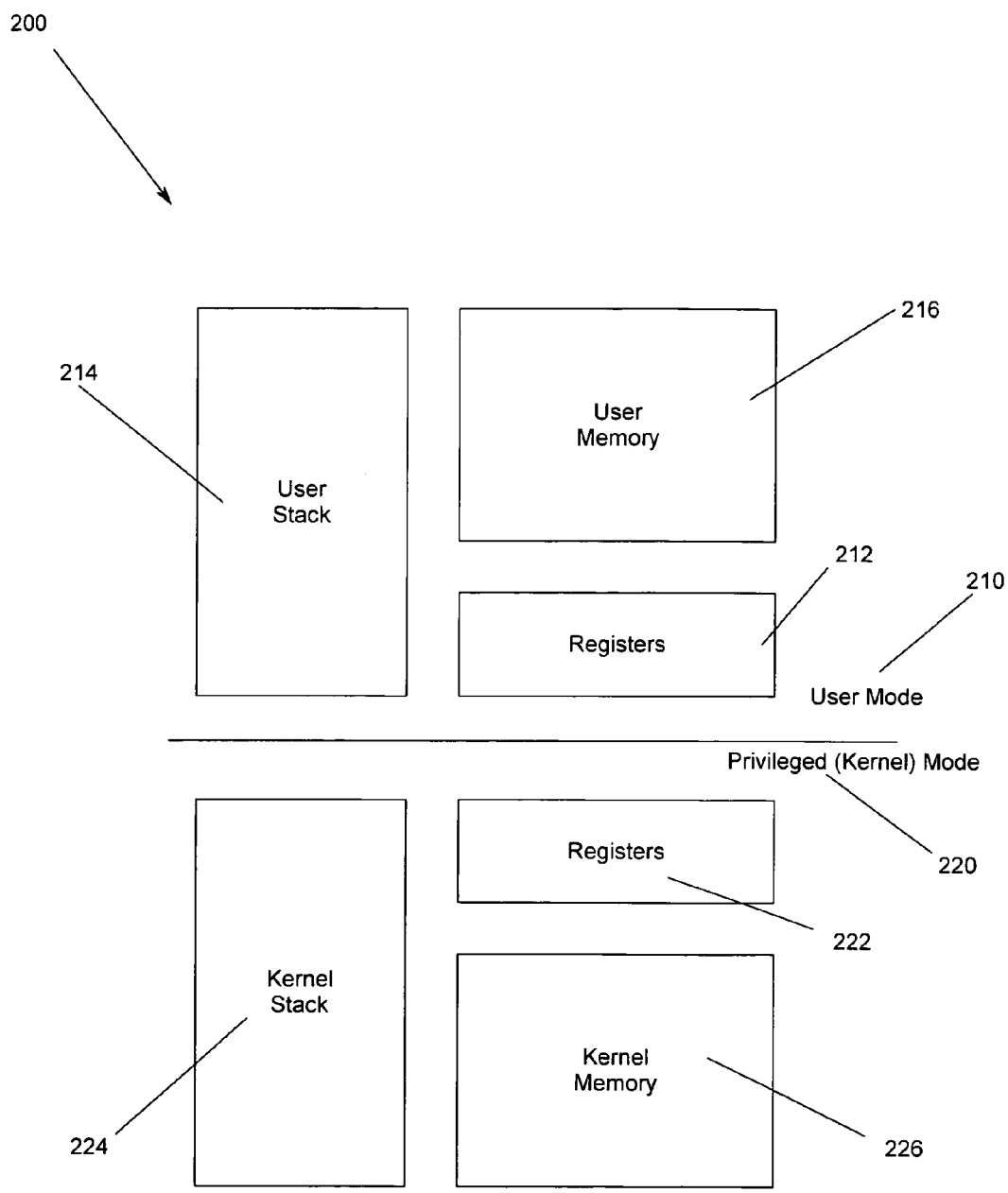
FIG. 2 shows the user mode and kernel mode states according to an embodiment of the present invention.

FIG. 2 shows the user mode and kernel mode states 200 according to an embodiment of the present invention. In FIG. 2, a user mode 210 and kernel mode 220 are shown. Applications and subsystems run on the computer in user mode 210. Processes that run in user mode 210 do so within their own virtual address spaces. They are restricted from gaining direct access to many parts of the system, including system hardware, memory not allocated for user mode 210, and other portions of the system that might compromise system integrity.

Processes that run in kernel-mode 220 can directly access system data and hardware, and are not restricted like processing running in user-mode 210. Performance-sensitive drivers and services run in kernel mode 220 to interact with hardware more efficiently. All components for processes running in kernel-mode 220 are fully protected from applications running in user mode 210. Processes that run in user mode 210 are effectively isolated from processes running in kernel-mode 220 and other processes running in user-mode 210.

In FIG. 2, a thread for a process running in user mode 210 is characterized as having its own context including registers 212 and memory stack 214. A user stack 214 is a data structure that includes a series of memory locations and a pointer to the initial location. All processors provide instructions for placing and retrieving values to and from the stack 214. The user memory 216 is a block of memory that is dedicated to the use of a current process running in user mode 210. A complete user state of a thread is maintained in user registers 212.

The kernel operates in its own protected address space and includes its own registers 222 and kernel stack 224. The kernel maintains the integrity of its own data structures and that of other processes. The kernel stack 224 includes information used by the kernel. Kernel memory 226 is generally shared by all processes, but is only accessible in kernel mode 220. Context switches from one task to another happen on the kernel stack 214 of the current process.

Figure 3:
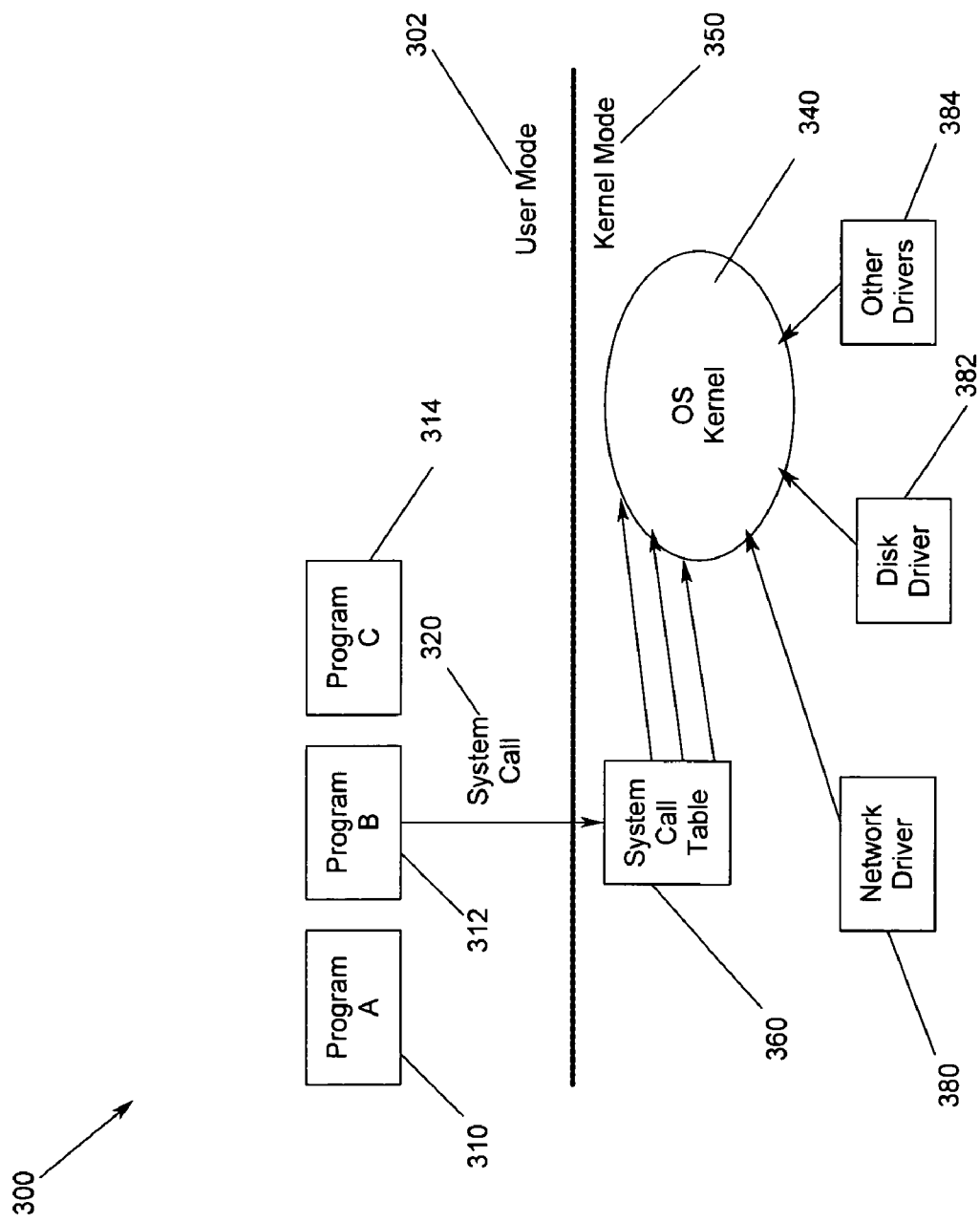
FIG. 3 illustrates a computer system wherein a system call is made from a user mode application to kernel mode according to an embodiment of the present invention.

FIG. 3 illustrates a computer system 300 wherein a system call is made from a user mode application to kernel mode according to an embodiment of the present invention. In FIG. 3, three programs 310, 312, 314 are running in the user mode 302. A program, e.g., program B 312, generates a system call 320. A system call 320 is a request by a running task to the kernel 340 to provide some sort of service on its behalf. In general, the services of the kernel 340 invoked by system call 320 comprise an abstraction layer between hardware and user-space programs, allowing a programmer to implement an operating environment without having to tailor the program(s) too specifically to one single brand or precise specific combination of system hardware components. Device drivers 380-384 are provided to allow the kernel 340 to access hardware.

The system call 320 requests a service to be performed by the kernel 340 running in the kernel mode 350 (i.e., the core of the operating system), such as input/output (I/O) or process creation (i.e., creation of a new process). The kernel 340 is the operating system software running in protected mode and having access to the hardware's privileged registers. The kernel 340 is not a separate process running on the system. It is the core of the operating system, which controls the scheduling of processes to achieve multitasking, and provides a set of routines, constantly in memory, to which every program 310, 312, 314 in the user-space 302 has access to. Some operating systems employ a microkernel architecture, wherein device drivers and other code are loaded and executed on demand and are not necessarily always in memory.

The system call 320 generates a trap, and passes arguments and an index into a system call table 360 for the service requested. The system call table 360 is used to maintain a list of all registered system calls 320 and includes a list of system call number that are assigned to each system call. The kernel 340 processes the request by looking-up the index passed to see the service that is to be performed, and carries out the request. Upon completion of the system call 320, the kernel 340 returns a value that represents either successful completion of the request or an error. If an error occurs, the kernel 340 sets a flag or indicator for indicating the reason for the error. The return value is then delivered to the process that made the system call 320 and the program 312 continues its execution.

Figure 4:
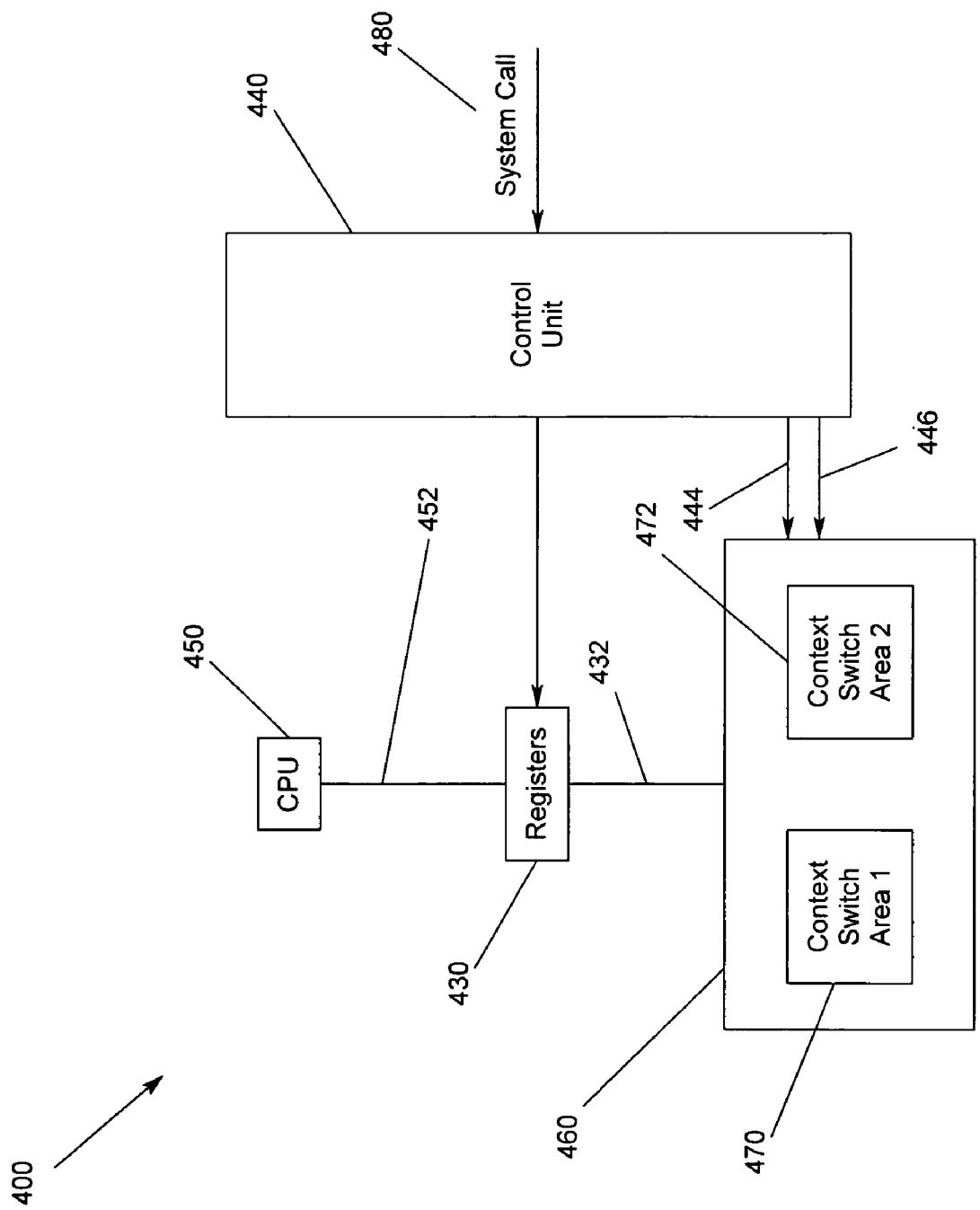
FIG. 4 is a system showing how a context switch may be handled.

FIG. 4 is a system 400 showing how a context switch may be handled. The system includes a CPU 450 and a set of register files 430. A control unit 440 controls the set of register files 430 and memory module 460. Memory module 460 has a plurality of context save areas 470, 472, in which contexts can be saved. The CPU 450 is coupled to the set of register files 430 via data bus 452. Control unit 440 is coupled to the set of register files 430 via control bus 442 accordingly, and is further coupled to memory module 460 via control bus 444 and through memory address bus 446. Register files 430 are coupled to memory module 460 via bus 432. Control unit 440 receives forward request 480 and backward requests 482 and determines a register file to be accessed by CPU 550 and which context is to be transferred between the register file and context save areas 470, 472 within memory module 460.

When a system call 480 is issued, a sequence of instructions is typically run to save the current context of the processor. This method by which the operating system makes one CPU suspend the execution of on process, and continue or begin executing a second process is referred to as a context switch. During a context switch, the CPU switches to using the full context of the second process, i.e., its execution stack, its memory area, the values the registers contained when last executing this process. A context switch is invoked when the current process is preempted by a system call. However, application programs do not expect context switch when calling those privileged instructions. Thus, a light weight system call is provided to perform the privileged instructions without saving and restoring processor context during system call.

FIG. 5 is a diagram of a system call table 500 according to an embodiment of the present invention. As shown in FIG. 5, the system call table 500 provides pointers to the functions that implement the system calls inside the kernel. Thus, the system call table 500 relates each system call to a specific function address within the kernel. In FIG. 5, each entry point for a system call 510 is identified by a service name 512 and a system call number 514. System calls may use arguments 516 in performing the function of the system call. The system call table 500 also includes a column for the results 518 of the system call.

In order to invoke system calls that perform privileged instructions without requiring that the processor context be saved and restored, entry points for lightweight system calls 520 are also provided in the system call table 500. System call numbers for the entry points 520 are designed for the light weight system calls. The light weight system calls 520 will skip the code for saving and restore processor context. Thus, the light weight system calls 520 return without going through context switch.

Figure 6:
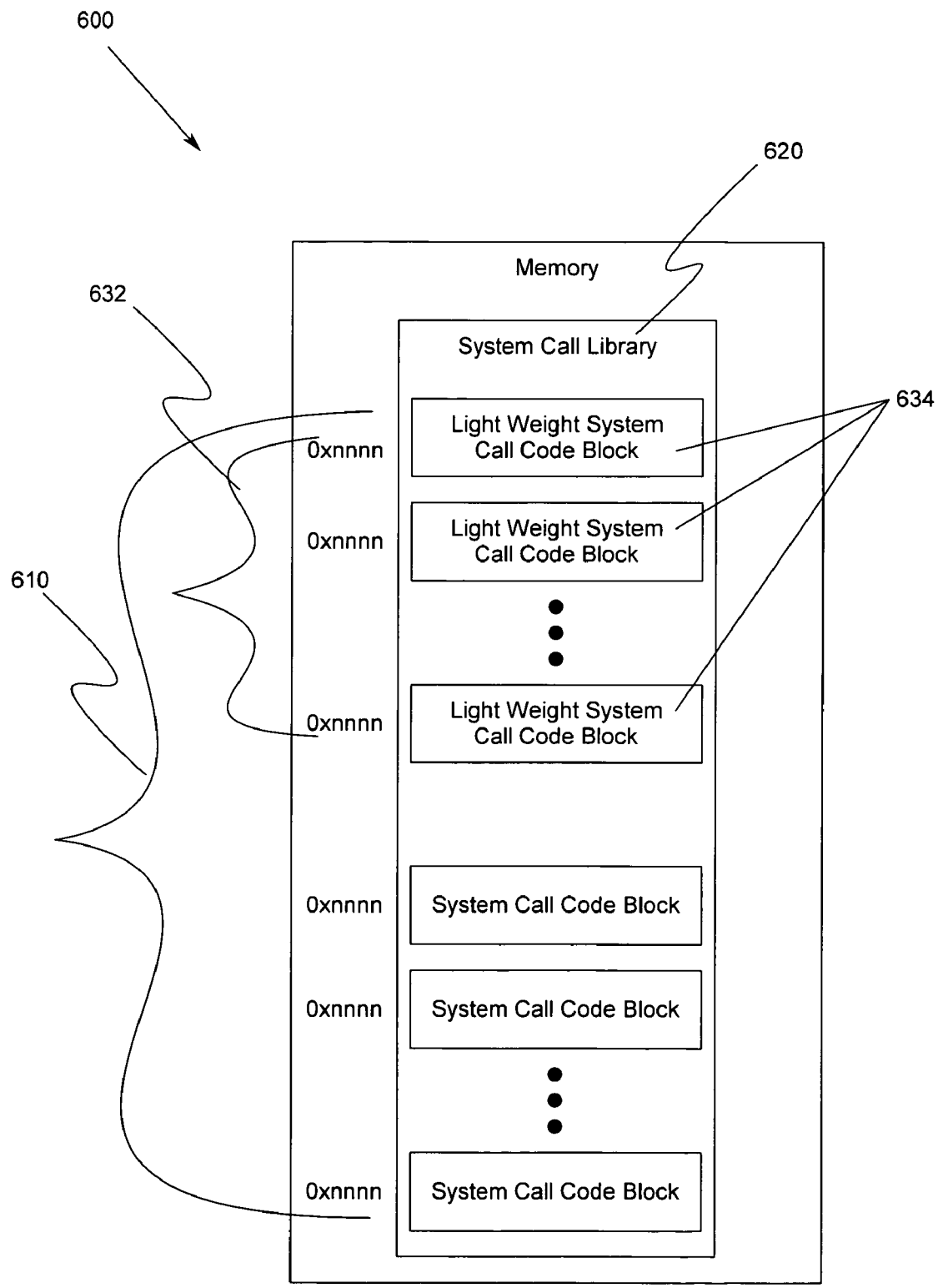
FIG. 6 illustrates a library for system call codes in memory according to an embodiment of the present invention.

FIG. 6 illustrates a library for system call codes in memory 600 according to an embodiment of the present invention. In FIG. 6, the memory 600 includes a range of addresses 610. Within the range of addresses 610, the system call library 620 is provided. The library 620 is merely a grouping and may not be a contiguous range of addresses for all of the system calls. The system library 620 may includes a plurality of code blocks for system calls. A portion of the addresses 632 in memory 610 are allocated for light weight system call codes 634. The portion of the addresses 632 in memory 610 that are allocated for light weight system call codes 634 may be reserved at an upper range of addresses. Accordingly, when one of the light weight system calls 520 shown in the system call table 500 of FIG. 5 is invoked, an entry point in the system call table 500 for the invoked system call references one of the address 632 allocated in the library of system calls 620 for the light weight system calls 634.

Figure 7:
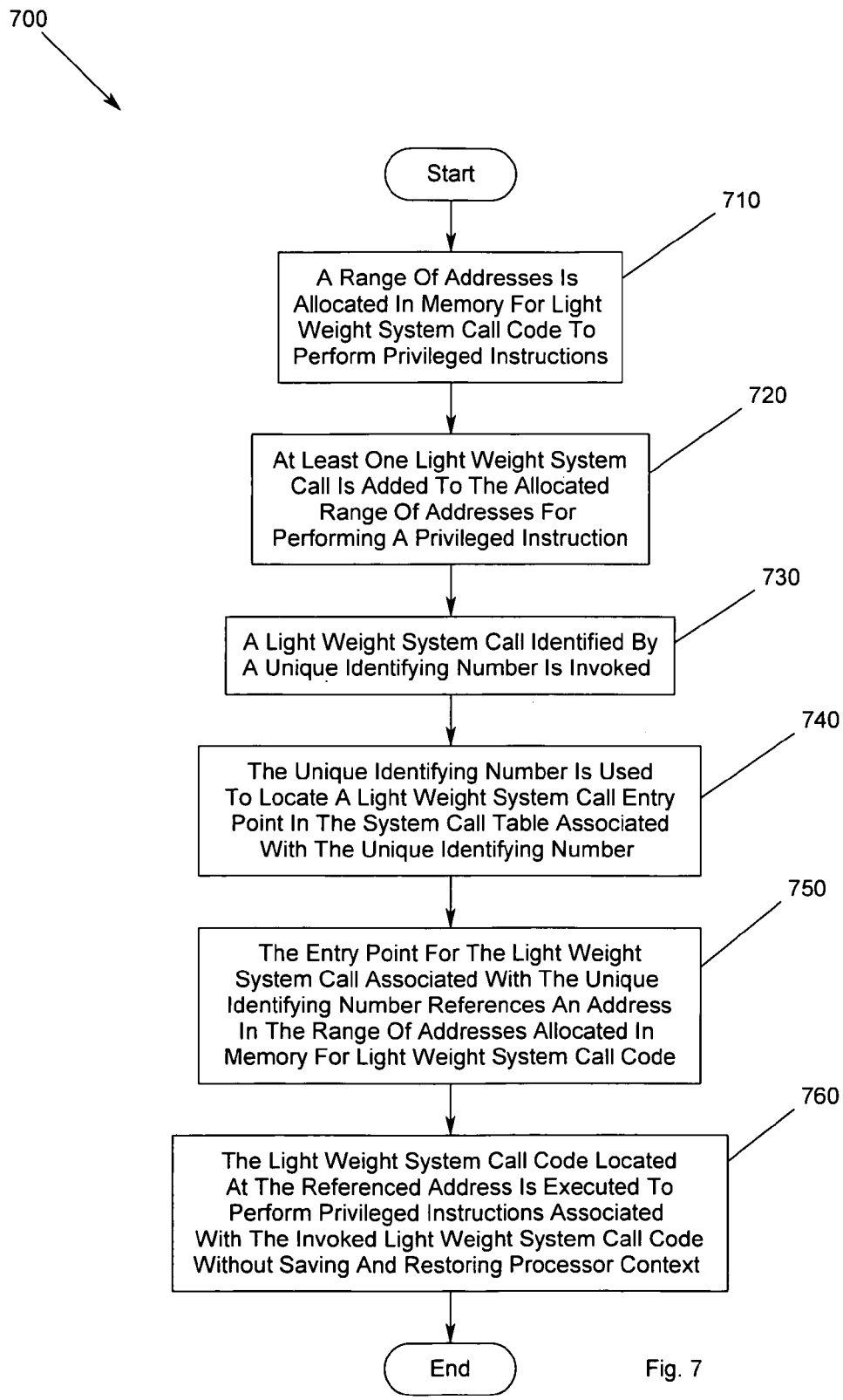
FIG. 7 is a flow chart of a method for providing light weight system calls to improve user mode performance according to an embodiment of the present invention.

FIG. 7 is a flow chart 700 of a method for providing light weight system calls to improve user mode performance according to an embodiment of the present invention. In FIG. 7, a range of addresses is allocated in memory for light weight system call code to perform privileged instructions 710. At least one light weight system call is added to the allocated range of addresses for performing a privileged instruction 720. A light weight system call identified by a unique identifying number is invoked 730. The unique identifying number is used to locate a light weight system call entry point in the system call table associated with the unique identifying number 740. The entry point for the light weight system call associated with the unique identifying number references an address in the range of addresses allocated in memory for light weight system call code 750. The light weight system call code located at the referenced address is executed to perform privileged instructions associated with the invoked light weight system call code without saving and restoring processor context 760.

Figure 8:
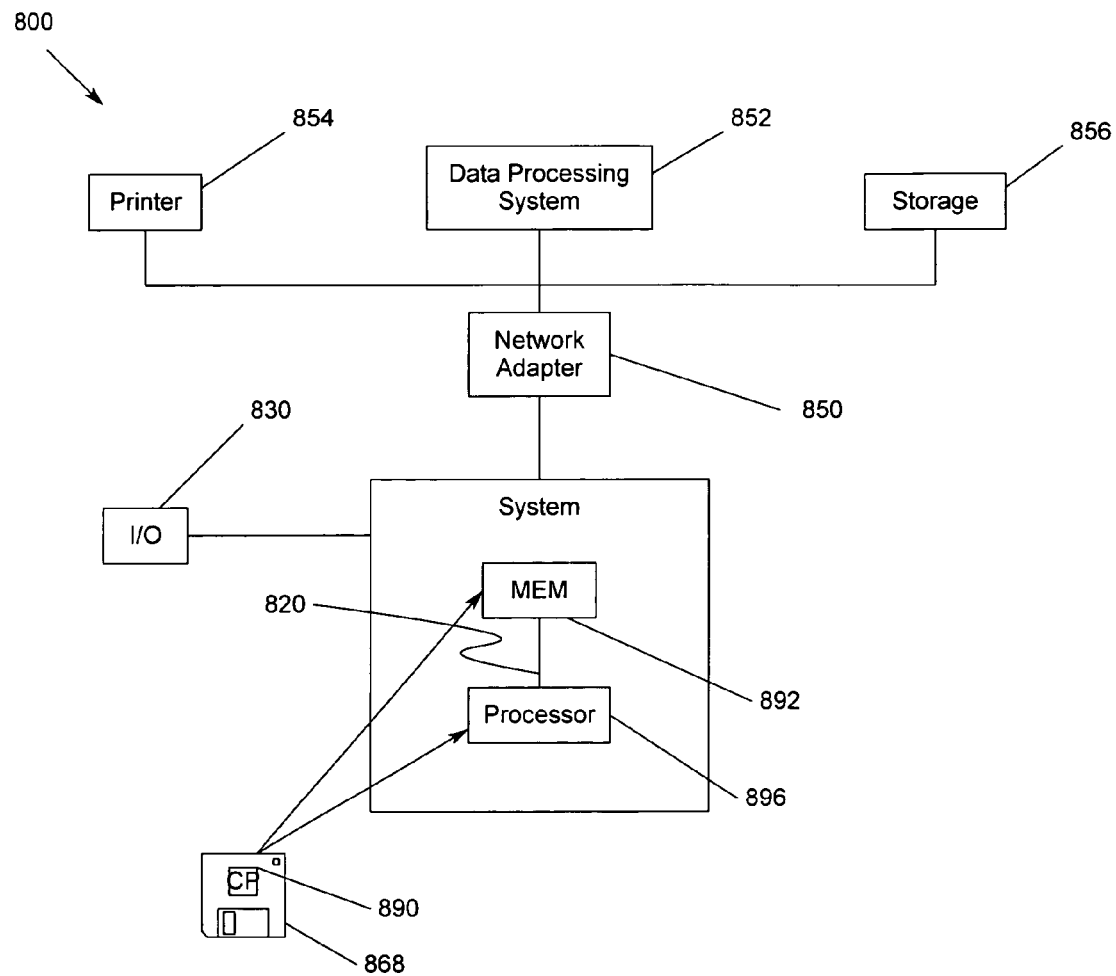
FIG. 8 illustrates a system according to an embodiment of the present invention.

FIG. 8 illustrates a system 800 according to an embodiment of the present invention. Embodiments of the present invention may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 890 accessible from a computer-usable or computer-readable medium 868 providing program code for use by or in connection with a computer or any instruction execution system.

For the purposes of this description, a computer-usable or computer readable medium 868 can be any apparatus that can contain, store, communicate, propagate, or transport the program for use by or in connection with the instruction execution system, apparatus, or device. The medium 868 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A system suitable for storing and/or executing program code will include at least one processor 896 coupled directly or indirectly to memory elements 892 through a system bus 820. The memory elements 892 can include local memory employed during actual execution of the program code, bulk storage, and cache memories which provide temporary storage of at least some program code in order to reduce the number of times code must be retrieved from bulk storage during execution.

Input/output or I/O devices 840 (including but not limited to keyboards, displays, pointing devices, etc.) can be coupled to the system either directly to the system or through intervening I/O controllers.

Network adapters 850 may also be coupled to the system to enable the system to become coupled to other data processing systems 852, remote printers 854 or storage devices 856 through intervening private or public networks 860. Modems, cable modem and Ethernet cards are just a few of the currently available types of network adapters.

Accordingly, the computer program 890 comprise instructions which, when read and executed by the system 800 of FIG. 8, causes the system 800 to perform the steps necessary to execute the steps or elements of the present invention The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing light weight system calls by a processing device, the method comprising:
   adapting a system call table to include a first entry point for identifying a selected one of a plurality of light weight system call code blocks and at least one second entry point for identifying at least one system call code block located within a system call library, the system call library provided within a range of addresses allocated in memory;
   allocating a portion of the range of addresses for the plurality of light weight system call code blocks; and,
   performing privileged instructions associated with the selected light weight system call code block without saving and restoring processor context.

2. The method of claim 1, wherein the selected light weight system call code block identified by the first entry point skips code for saving and restoring the processor context.

3. The method of claim 2, wherein the selected light weight system call code block identified by the first entry point causes the selected light weight system call code block identified by the first entry point to return without executing a context switch.

4. The method of claim 1, wherein the selected light weight system call code block identified by the first entry point causes the selected light weight system call code block identified by the entry point to return without executing a context switch.

5. The method of claim 1, further including identifying the first entry point by a unique identifying number.

6. The method of claim 1, wherein the first entry point further including referencing the first entry point to a memory address at an upper range of addresses in memory.

7. A memory for providing a library of system calls, comprising:
   a plurality of addresses, wherein a range of the plurality of addresses is allocated for a plurality of light weight system call code blocks and at least one system call code block, the at least one light weight system call code block and at least one system call code block located in the system call library;
   wherein the plurality of light weight system call code blocks are configured to perform privileged instructions without saving and restoring processor context.

8. The memory of claim 7, wherein the plurality of light weight system call code blocks are configured to skip code for saving and restoring the processor context when executed.

9. The memory of claim 8, wherein the plurality of light weight system call code blocks are configured to cause a return from a light weight system call to be performed without executing a context switch.

10. The memory of claim 7, wherein the plurality of light weight system call code blocks are configured to cause a return from a light weight system call to be performed without executing a context switch.

11. The memory of claim 7, wherein the plurality of addresses are located in an upper range of addresses in the memory.

12. A program storage device, comprising:
   program instructions executable by a processing device to perform operations for providing light weight system calls to improve user mode performance, the operations comprising:
   adapting a system call table to include a first entry point for identifying a selected one of a plurality of light weight system call code blocks and at least one system call code blocks located within a system call library, the system call library provided within a range of addresses allocated in memory;
   allocating a portion of the range of addresses for the plurality of light weight system call code blocks; and,
   performing the privileged instructions associated with the selected light weight system call code block without saving and restoring processor context.

13. The program storage device of claim 12, wherein the operations further comprise: invoking the at least one light weight system call code blocks selected from the range of addresses.

14. The program storage device of claim 12, wherein the performing the privileged instructions associated with the selected light weight system call code block without saving and restoring processor context further comprises skipping code for saving and restoring the processor context.

15. The program storage device of claim 14, wherein the performing the privileged instructions associated with the selected light weight system call code block without saving and restoring processor context further comprises returning from invoking the selected light weight system call code block without executing a context switch.

16. The program storage device of claim 12, wherein the performing the privileged instructions associated with the selected light weight system call code block without saving and restoring processor context further comprises returning from the selected light weight system call code block that has been invoked without executing a context switch.

17. The program storage device of claim 13, wherein invoking the selected light weight system call code block further comprises:
   identifying the selected light weight system call code block by a unique identifying number;
   locating the first entry point associated with the unique identifying number;
   referencing an address with the range of addresses in memory for the selected light weight system call code block; and
   executing the selected light weight system call code block located at the referenced address.

18. The program storage device of claim 12, wherein the allocating a range of addresses in memory for the selected light weight system call code block to perform privileged instructions further comprises allocating memory addresses at an upper range of addresses in the memory.

* * * * *